United States Patent

Kinoshita

Patent Number: 5,356,514
Date of Patent: Oct. 18, 1994

[54] PROCESS AND APPARATUS FOR ETCHING IRON-CONTAINING MATERIALS

[75] Inventor: Keizo Kinoshita, Tokyo, Japan

[73] Assignee: NEC Corporation, Tokyo, Japan

[21] Appl. No.: 750,274

[22] Filed: Aug. 27, 1991

[30] Foreign Application Priority Data

Aug. 27, 1990 [JP] Japan .................. 2-224596

[51] Int. Cl.⁵ .................................. B05D 5/00
[52] U.S. Cl. ......................... 156/643; 156/646; 156/656; 156/664
[58] Field of Search ............... 156/643, 646, 656, 664, 156/651

[56] References Cited

U.S. PATENT DOCUMENTS

| | | | |
|---|---|---|---|
| 4,375,390 | 3/1983 | Anderson et al. | 156/643 X |
| 4,439,294 | 3/1984 | Brill et al. | 156/643 X |
| 4,693,777 | 9/1987 | Hazano et al. | 156/643 X |
| 5,091,050 | 2/1992 | Fujimo et al. | 156/656 X |

Primary Examiner—Thi Dang
Attorney, Agent, or Firm—Burns, Doane, Swecker & Mathis

[57] ABSTRACT

Disclosed is an etching apparatus primarily comprising a reactive etching chamber, a post-treatment chamber connected thereto and/or a purified water treatment chamber connected to the post-treatment chamber and also a process for etching a film of Fe-containing material forming the surface of a sample, which comprises subjecting the sample to reactive etching in an atmosphere of chlorine-containing gas while the sample is heated to not lower than 250° C. in vacuo, wherein the sample may be subjected to an ion shower of a gaseous mixture comprising the chlorine-containing gas and at least one inert gas while the sample is heated to not lower than 250° C. and not higher than the melting point of the sample; subjecting the sample to post-treatment so as to allow the etching residues left on the sample surface to react fully with the chlorine-containing gas; and then subjecting the sample to a purified water treatment by immersing the sample in a purified water so as to dissolve and remove the etching products formed during said post-treatment step.

4 Claims, 6 Drawing Sheets

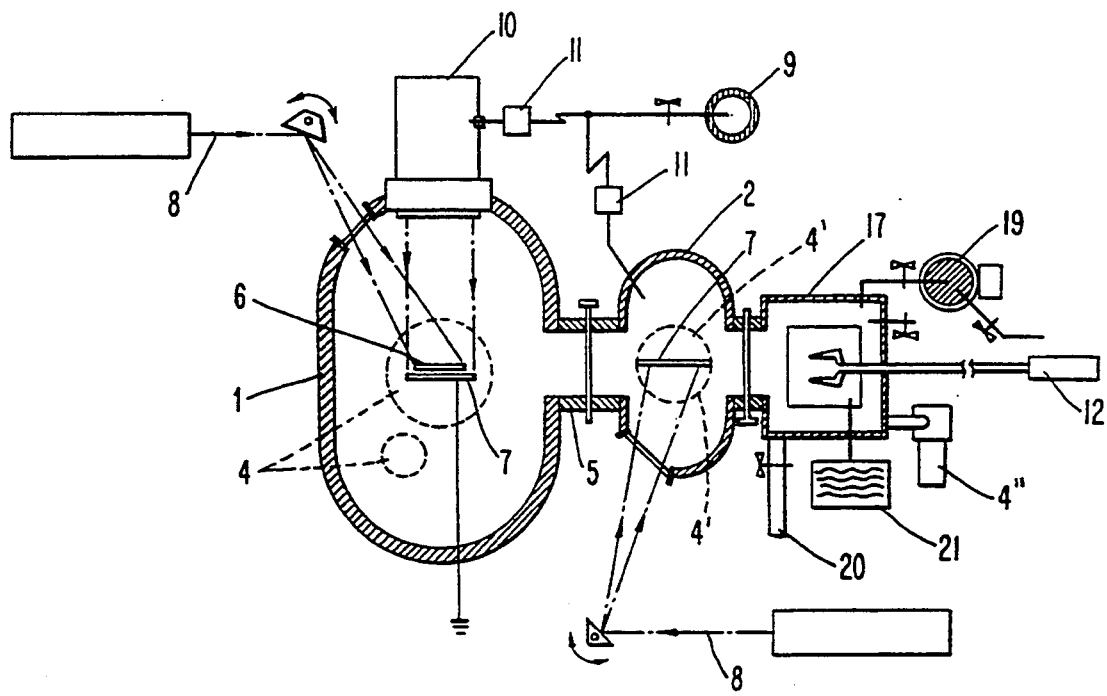
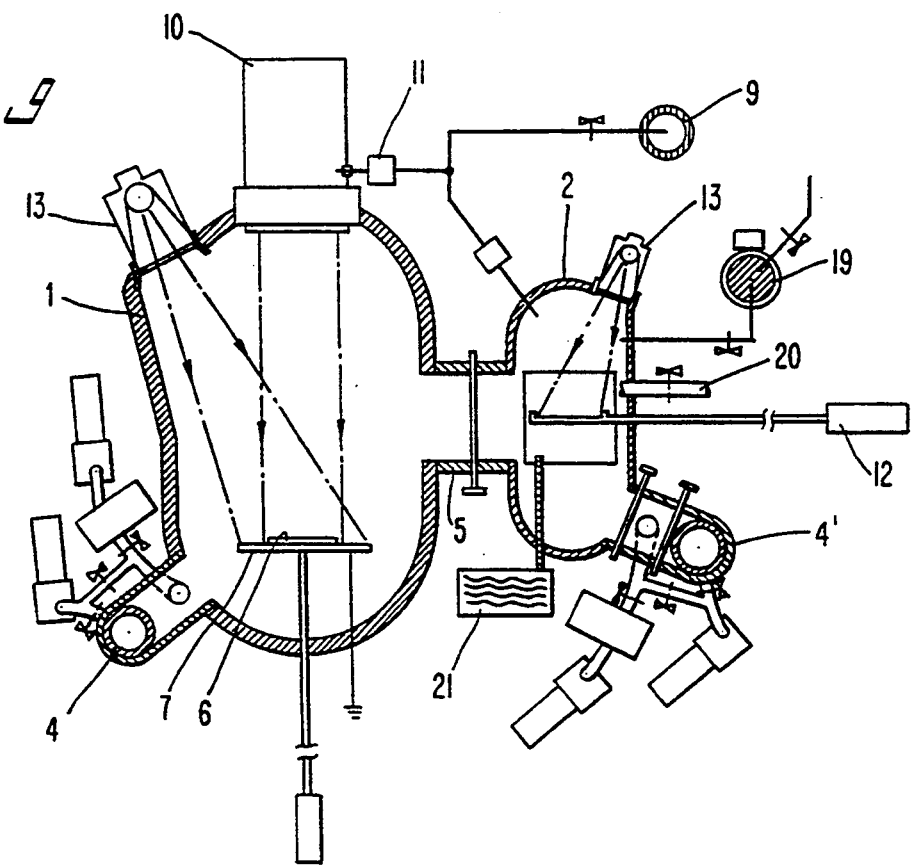

PROCESS AND APPARATUS FOR ETCHING IRON-CONTAINING MATERIALS

BACKGROUND OF THE INVENTION

This invention relates to a process for etching Fe-containing materials to be used as the magnetic poles in thin-film magnetic heads and magnetic sensors and to an apparatus therefor.

Ion milling by an argon ion beam etching apparatus has conventionally been used for etching Fe-containing materials. In this process, which can be referred to as a physical etching, a solid sample is subjected to ion bombardment of an ionized inert gas such as an argon gas accelerated under application of electric field, and the sputtering phenomenon occurring at the surface of the sample is utilized for etching. The conditions for the ion milling using argon gas are usually set as follows: argon gas pressure $-4 \times 10^{-4}$ torr, ion accelerating voltage=450 V, ion current density=0.6 mA/cm$^2$, and ion beam incident angle=0° to 45°. The etching rate achievable by ion milling is about 100 to 150 A/min in the case of Fe-Si-Al alloys or pure Fe, and about 200 to 250 A in the case of Ni-Zn-Fe$_2$O$_4$ (ferrite).

The argon ion milling of the above techniques for etching Fe-containing materials suffers a problem of etching selectivity, i.e. there is a difference between the etching rate of PR (photoresist) and that of the material to be etched, since it is a physical etching and photoresists are also etched together with the materials. For example, the ratio of etching rate of pure Fe to that of PR is about 2:1, which is not sufficient in practical uses. When a 3 $\mu$m thick pure Fe material, for example, is to be etched, a PR pattern having vertical side walls and a thickness of at least about 1.5 $\mu$m, practically not less than 2 $\mu$m taking process margins into consideration, must be formed. However, it has been difficult to form such vertically cut pattern having a rectangular cross section. Beside, the achievable etching rate is about 150 A/min, and it takes 200 minutes to achieve etching of a thickness of, for example, 3 $\mu$m, so that the articles obtained by application of prior art have suffered low throughputs, leading to cost elevation. What is more serious is the cross-sectional shape of the etched Fe-containing material. When the argon ion milling process is carried out using a 3 $\mu$m wide PR pattern having a rectangular cross section as shown in FIG. 1(A), etching takes place in the Fe-containing material to have a trapezoidal cross section, as shown in FIG. 1(B). Since the cross section of the article etched by the prior art thus comes to have a trapezoidal cross section, the following problems occur when the prior art technique is applied to a process of making a thin-film magnetic head:

(1) The recording track width at the upper part of the thus obtained head and that at the lower part thereof will be greatly different, and the track width, a parameter for deciding the basic characteristics as the magnetic head, cannot accurately be defined;

(2) When a smaller track width is to be formed, the cross section of the upper part of the magnetic pole will be triangular to provide a very narrow track which limits increase in the recording density.

An object of this invention is to provide a process for etching a Fe-containing material which can overcome the above problems and an apparatus therefor.

SUMMARY OF THE INVENTION

It is a characteristic of the process for etching a Fe-containing material according to this invention that it consists of a step of subjecting a sample to a reactive etching in an atmosphere of chlorine-containing gas while the sample is heated at not lower than 250° C. and not higher than the melting point of the sample in vacuo, a post-treatment step for allowing the unreacted Fe-containing etching residues remaining on the surface of the sample to react fully with the chlorine-containing gas and a purified water treatment step of immersing the sample in a stream of purified water or in a purified water tank to which ultrasonic wave is applied, for a predetermined time, so as to dissolve and remove the etching product formed during the post-treatment step. In the post-treatment step, the residue is allowed to react with the chlorine-containing gas by heating the sample to not lower than 250° C. and not higher than the melting point of the sample in vacuo or under reduced pressure in the chlorine-containing gas atmosphere, or by subjecting the sample to ion shower of a gaseous mixture consisting of a chlorine-containing gas and at least one inert gas at the same temperature at a low accelerating voltage.

On the other hand, it is a characteristic of the apparatus according to this invention for practicing the above process for etching a Fe-containing material that it has an etching chamber in which the sample can be heated and an independent post-treatment chamber for allowing the etching residues left on the surface of the sample after completion of etching to react fully with a reactive gas, and that the present apparatus further has, as necessary, an independent purified water treatment chamber in which the sample is immersed in a stream of purified water or a purified water tank to which an ultrasonic wave is applied, for a predetermined time, so as to dissolve and remove the etching product formed during the post-treatment step. It is a further characteristic of the present apparatus that the post-treatment chamber may also be used as the purified water treatment chamber depending on the request for the etching conditions.

Since the ion milling process gives trapezoidal cross sections in the Fe-containing material after completion of etching, the present inventor made studies on the milling of Fe-containing materials by reactive ion etching process having a potentiality of anisotropic milling (see Japanese Patent Application No. 231514/1989. It was thus found that in the reactive ion etching, the etching rate, which decides the throughput of products, is greatly dependent on the sample temperature during etching, and he investigated the relationship between the sample temperature and the etching rate.

The apparatus for reactive ion etching used for the investigation is of a constitution as shown in FIG. 2, and the etching test was carried out, for example, in the following manner. A heater 3 was set in the target plate 7 of an etching chamber 1 evacuated to about $1 \times 10^{-6}$ torr, as shown in FIG. 2, and the target plate 7 was entirely maintained at an arbitrary temperature between about 170 and about 500° C. A sample 6 consisting of a sapphire wafer with a 2 $\mu$m thick film of Fe-containing material (Si: 9.6 wt %, Al: 5.4 wt %, Fe-Si-Al alloy: rest) formed thereon by sputtering and a masking pattern (thickness: 2 $\mu$m, width: 3 to 10 $\mu$m) made of an inorganic material (SiO$_2$ was used) having a rectangular cross section was mounted on the target plate 7. A high-frequency wave is adapted to be applied across the target plate 7 and an anode plate 22. A gas feeding system 11 for feeding carbon tetrachloride as the chlorine-containing gas 9 to the surface of the sample is provided around the target plate 7 so that a necessary amount of carbon tetrachloride may be supplied from the outside of the etching chamber 1.

Using the apparatus as described above, samples 6 were heated by the heater 3 to various temperatures to carry out reactive ion etching in a high-frequency plasma of carbon tetrachloride gas. Typical etching conditions are as follows:

| Flow rate of $CCl_4$: | 30 SCCM |
|---|---|
| Gas pressure of $CCl_4$: | 5 Pa |
| Discharge power density: | 0.43 W/cm$^2$ |

The sample 6 was removed from the etching chamber 1 after completion of etching to perform SEM observation of the broken face of the sample 6 and determine etching rate by measuring the etching depth. Thus, the relationship between the temperature and the etching rate was obtained as shown in FIG. 3. It can be seen from FIG. 3 that the etching rate showed steep rise from the sample temperature of about 250° C., and such high etching rate is practical enough to form fine patterns.

However, SEM observation of the sample also showed that etching residues still remain on about 50% of the samples etched at about 250° C. AES analysis of the residues further showed that they are the same as those observed on about 80% of the samples etched at the sample temperature of 200° C.

This means that if a fine pattern of the Fe-containing material etched using the above heating procedure is used as such as a thin-film magnetic head, corrosion of the Fe-containing material is accelerated by the Cl contained in the etching residues to be likely to detract extended reliability. It can be considered as one cause of this problem that chloride of particularly iron among other elements constituting the Fe-containing material can yet show only a small vapor pressure at about 250° C., so that the etching products (chlorides) formed by the chlorine-containing gas plasma are not volatilized from the sample surface and remain as the etching residues. It can further be considered as another cause that nonuniformity such as by the native oxide film formed on the surface and crystal grain boundaries is present in the Fe-containing material, so that the reaction between Fe and Cl proceeds reluctantly in some portions to leave such portions as the etching residues nonuniformly all over the sample surface.

However, if the etching residues are all chlorides, it will be possible to remove them by treatment with a purified water since many of chlorides of various elements including iron chloride have water solubility. Thus, the present inventor investigated the post-treatment step for allowing the unreacted Fe-containing material remaining on the sample surface to react fully with Cl and the subsequent step of treating the sample with a purified water so as to remove the chlorides produced by etching.

First, referring to the post-treatment step, minute investigation of this invention successfully identified notable formation of chlorides with the etching residues in the following two steps:

(1) to heat the sample to a temperature not lower than 250° C. and not higher than the melting point of the sample in vacuo or under reduced pressure in a chlorine-containing gas atmosphere for a predetermined time; and (2) subjecting the sample to a low-energy ion shower using a gaseous system consisting primarily of chlorine gas to which an inert gas such as argon, neon and helium is added to effect secondary etching of the sample surface by a low-accelerating voltage controllable ion shower source (ca. 200 V), while the sample is heated for a predetermined time to the temperature within the specified range.

When these two steps are compared with each other, the former enjoys an advantage that the entire constitution of the apparatus can be simple so that the cost for producing the apparatus can greatly be reduced; whereas the latter enjoys advantages that the etching residues can be reacted with the chlorine-containing gas at high efficiency in a short time and that the pattern conversion difference (difference between the original PR pattern size and the size of the Fe-containing material pattern) is smaller than in the former step and finer patterns can be formed with high accuracy. The reason why the low-accelerating voltage controllable ion shower source is used is that it can prevent increase in the pattern conversion difference to be caused by side-etching, damage of the wafer surface of the sample, overheating of the sample and unstable ion current occurred when operated under low-accelerating voltage condition, all of which were observed when tested using a high-accelerating voltage (about 500 V) apparatus.

Further investigation of these post-treatment steps proved that it is more preferred to carry out the post-treatment in an independent post-treatment chamber rather than in the etching chamber. If the post-treatment is carried out in the etching chamber, the following problems arise:

(1) Since heating is employed, expensive units (e.g. a Kaufman type ion source for reactive ion beam etching) for subjecting the sample to reactive etching with a chlorine-containing gas easily wear by the heat radiation, and the presence of chlorine-containing gas accelerates this phenomenon;

(2) Since the etching chamber must first be used for heating the sample in a gas or in vacuo, productivity will be low;

(3) Since a not very high degree of vacuum as in etching is required in the post-treatment step, it is not economical to use the reactive etching chamber and the expensive evacuation system thereof in view of corrosion which may proceed in the apparatus; and (4) When the sample is subjected to ion shower, it is difficult to install two etching mechanisms in one chamber in view of the structure of the chamber, since the weight of the apparatus will be too great and the mechanism will be too complicated.

Referring now to the purified water treatment step, the present inventor made further studies to achieve very clean sample surface with no etching residues by the following two steps:

(1) to immerse the sample for a predetermined time in a purified water tank to which an ultrasonic wave is applied; and (2) to immerse the sample in a stream of purified water for a predetermined time.

However, since these purified water treatment steps employ water and if etching chamber and the purified water treatment chamber are connected, there arises a problem that the intended degree of base pressure can hardly be achieved in the etching chamber. Studies made by the present inventor proved that it is possible to decrease the base pressure to be achieved in the etching chamber to $5\times10^{-11}$ torr by additionally providing a sample providing chamber (load locking chamber) if the purified water treatment chamber is not connected to the system of etching apparatus (see FIG. 4(A)). However, the lowest base pressure to be achieved in the etching chamber, when it was connected with the purified water treatment chamber with another chamber interposed therebetween (see FIG. 4(B)), was $1\times10^{-9}$ torr, while the same when the etching chamber was directly connected to the purified water treatment chamber (see FIG. 4(C)), which also serves as the post-treatment chamber, was $1\times10^{-6}$ torr. The minimum possible pattern size is greatly dependent upon the base pressure to be achieved, and the higher the vacuum is, the finer patterns can be etched.

However, since continuous treatment of samples (articles) is feasible if the purified water treatment chamber is connected to the system of the etching apparatus, this arrangement is convenient in view of improvement in the productivity of articles such as thin-film magnetic heads. This arrangement also allows size reduction of the entire system of etching apparatus which is operated according to the present process of etching Fe-containing materials (the system of apparatus required for the entire steps of etching including the final treatment with a purified water), leading to reductions in apparatus production cost, installation cost and installation area. The greatest merit of this arrangement is that it is not necessary to remove the sample from the etching chamber after completion of the post-treatment such as heating, so that the etching products and the Fe-containing material forming the pattern are prevented from being oxidized by the water vapor and oxygen contained in the atmosphere. In the studies of the present inventor, when the arrangement (FIG. 4(A)) of the etching chamber with no purified water treatment chamber disposed adjacent to the post-treatment chamber was used, discoloration of the sample when it was removed from the chamber into the atmosphere after completion of post-treatment, and corrosion on the side walls of the pattern were sometimes observed. However, when the arrangement (FIG. 4(B) or (C)) of the etching chamber having a purified water treatment chamber disposed adjacent to a post-treatment chamber was used, no such problems occurred.

BRIEF DESCRIPTION OF THE DRAWINGS

Embodiments of this invention will be described with reference to the attached drawings, in which:

,FIG. 4 schematically shows arrangements of the respective chambers used by the present inventors for the examination of this invention; and FIGS. 5 to 9 each show schematically an embodiment of etching apparatus according to this invention.

DESCRIPTION OF THE PREFERRED EMBODIMENTS

Next, the present process for etching Fe-containing materials and apparatus therefore will be described by way of preferred embodiments referring to the attached drawings.

First embodiment

Figure 1A:
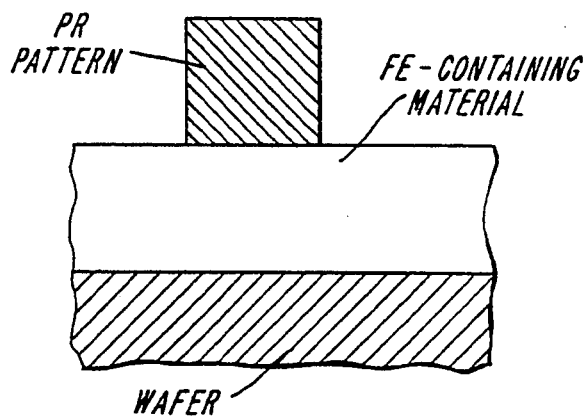
FIG. 1 illustrates the pattern conversion difference to be resulted according the prior art.
Figure 1B:
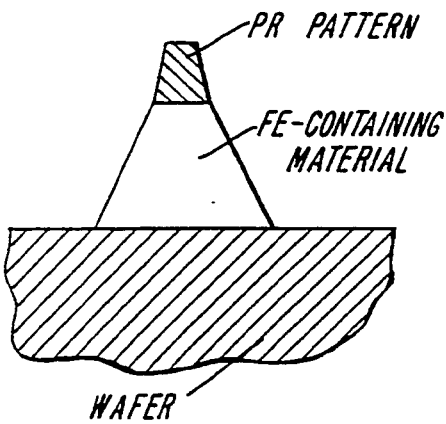
Figure 2:
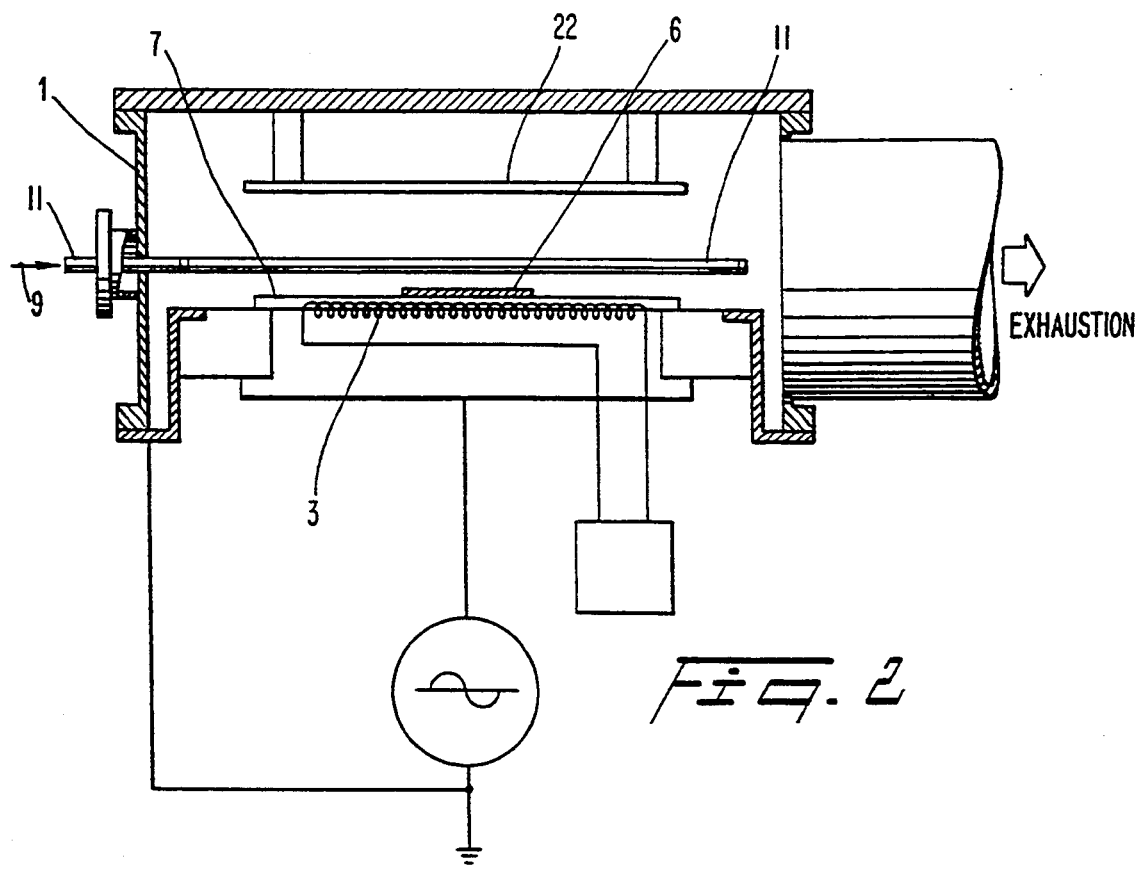
FIG. 2 shows a cross section of a reactive ion etching apparatus.
Figure 3:
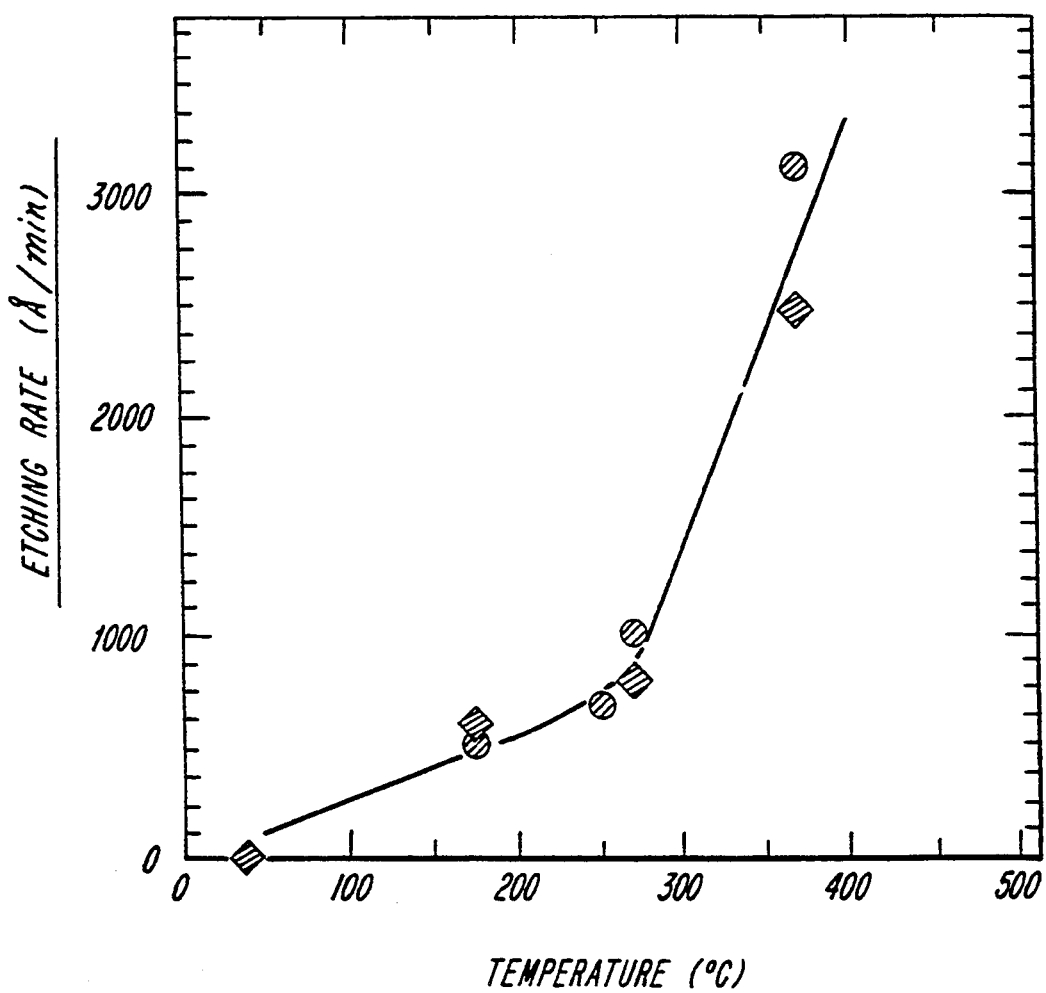
FIG. 3 shows the relationship between the etching rate of a Fe-Si-Al alloy and temperature.
Figure 4:
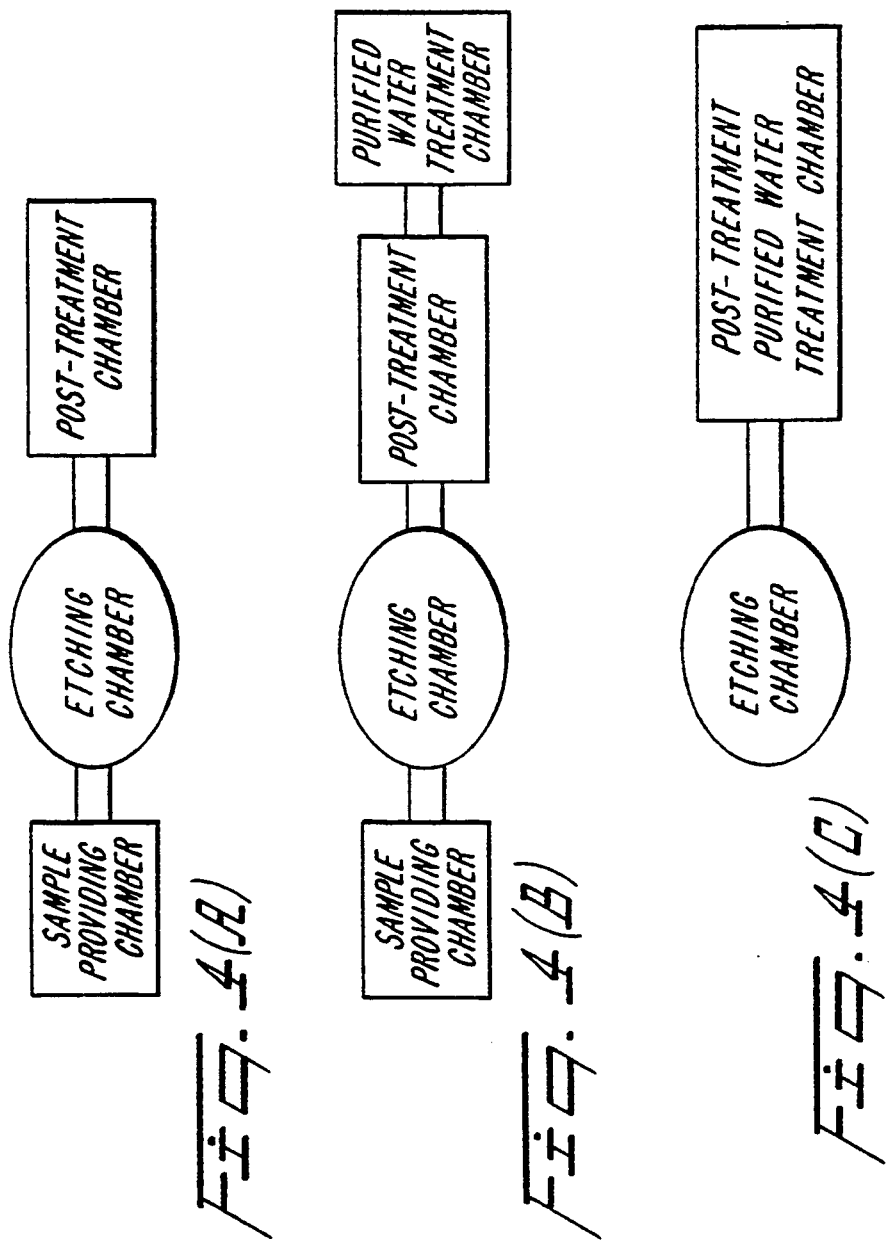
Figure 5:
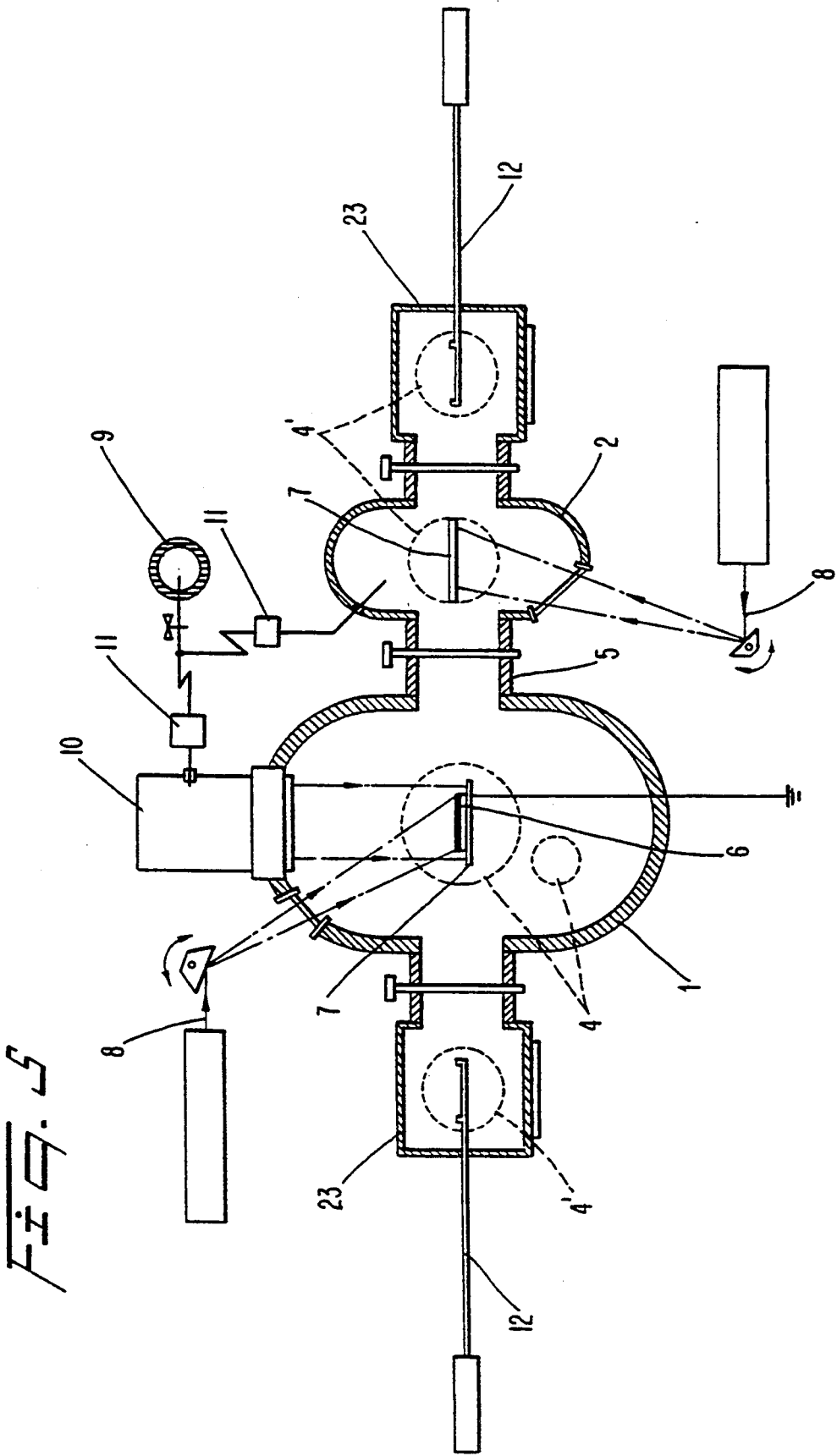

The apparatus used in a first embodiment is of a constitution as shown schematically, in horizontal cross section, in FIG. 5. The apparatus roughly consists of an etching chamber 1, a post-treatment chamber 2, a sample providing chamber 23, evacuation systems 4,4' and junction 5. Each chamber has a target plate 7 for holding the sample 6. Quartz windows are provided on the side wall of the etching chamber 1 and that of the post-treatment chamber 2 each at a position where the sample can be viewed therethrough so that laser beams 8 can be guided into the respective chamber. The surface of the sample 6 can be heated by laser beam scanning across the surface of the target plate 7. Further, a Kaufman type ion source 10, as the system for etching the sample 6 with a chlorine-containing gas 9 is disposed on the side wall of the etching chamber 1 at a position facing the sample 6. The gas 9 can be fed to both of the ion source 10 and the post-treatment chamber 2 through gas feeding systems 11 at arbitrary flow rates, respectively. The sample 6 can travel through the chambers in vacuo with the aid of a sample transferring mechanism 12 through the junction 5.

The results of etching performed using such arrangement of apparatus will be shown below; wherein the evacuation systems, sample and laser beam used are as follows:

| | |
|---|---|
| Evacuation system 4: | ion pump |
| Evacuation system 4': | rotary pump (roughing vacuum pump), turbo-molecular pump |
| Sample 6: | 1.2 mµ thick thin-film of Fe—Si—Al alloy formed by sputtering on a sapphire wafer, with a $SiO_2$ masking pattern having a width of 0.5 µm and a thickness of 1 µm |
| Laser beam 8: | laser beam of an argon laser |
| Chlorine-containing gas 9: | carbon tetrachloride |

The sample 6 was first heated in vacuo in the etching chamber 1, followed by a reactive ion beam etching using the chlorine-containing gas 9 with the sample 6 being maintained at the same temperature under the following etching conditions:

| | |
|---|---|
| Base pressure: | $5\times10^{-11}$ torr |
| Flow rate of $CCl_4$ gas: | 20 SCCM |
| Pressure of $CCl_4$ gas: | $2\times10^{-4}$ torr |
| Ion accelerating voltage: | 500 V |
| Ion current density: | 0.9 mA/cm$^2$ |
| Ion beam incident angle: | 30° |
| Sample temperature: | 350° C. |
| Etching time: | 10 min |

Subsequently, the sample 6 was transferred to the post-treatment chamber 2 through the junction 5 using the sample transferring mechanism 12. Post-treatment was carried out by heating the sample at a predetermined temperature for a predetermined time in a carbon tetrachloride gas atmosphere under the following post-treatment conditions:

| | |
|---|---|
| Base pressure: | $5 \times 10^{-10}$ torr |
| Flow rate of CCl$_4$ gas: | 30 SCCM |
| Pressure of CCl$_4$ gas: | 3 Pa |
| Sample temperature: | 350° C. |
| Treating time: | 10 min |

The thus treated sample 6 was removed from the post-treatment chamber 2 and then immersed in a stream of purified water for 20 minutes. Finally, the sample 6 was broken and the broken face was subjected to SEM observation to find that the a line pattern of Fe-Si-Al alloy having a rectangular cross section (width: ca. 0.46 μm; height: ca. 1.2 μm) was formed. Besides, no etching residue was observed on the sapphire substrate as the result of employing a combination of post-treatment step and purified water treatment step. Line patterns were formed with very good reproducibility. An etching rate of about 1,200 A/min was achieved in this test, which is a very high value for the Fe-Si-Al alloy (about 4 times as high as in the prior art), and thus it was identified that the present etching process and apparatus therefor are very useful.

Incidentally, while a sample providing chamber 23 is connected to teh system of etching apparatus in this embodiment, the etching characteristic may not be affected, if this chamber 23 may be omitted, except for the minor drop in the base pressure to be achieved in the respective chambers.

Second embodiment

Figure 6:
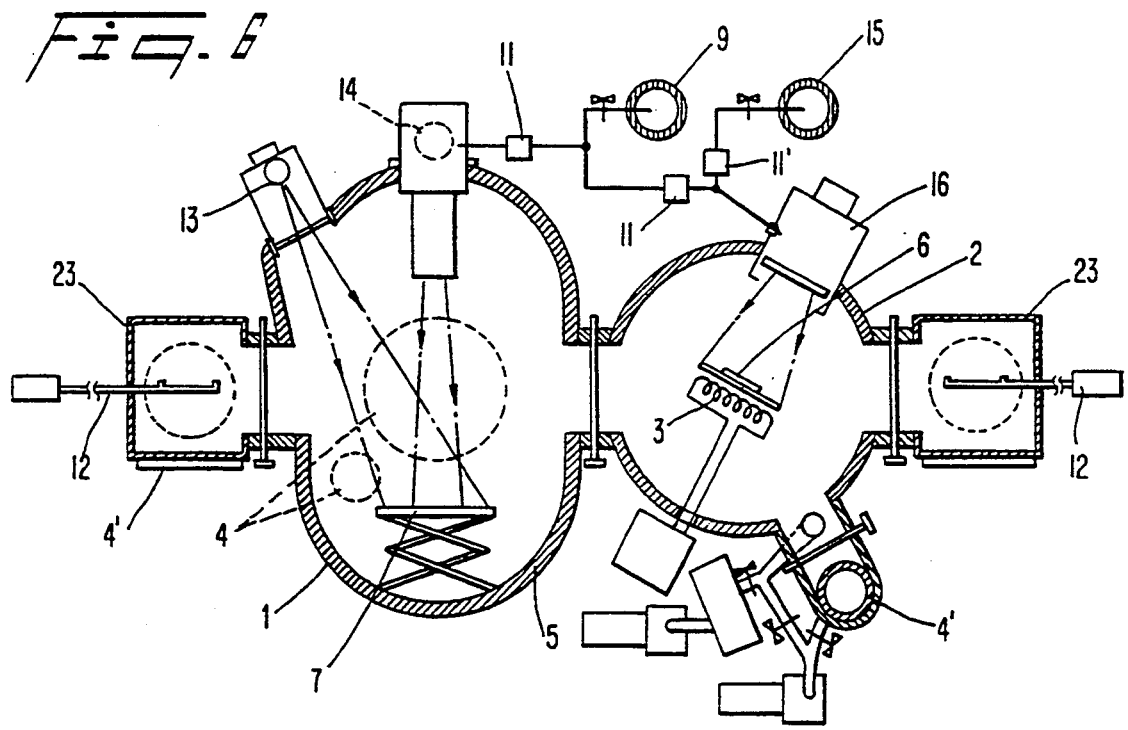

The apparatus used in a second embodiment is as shown in FIG. 6. What is different in this embodiment from the first embodiment will now be described. A quartz window is provided on the side wall of the etching chamber 1 at a position where the sample 6 can be viewed therethrough so that the sample 6 can be heated by irradiation of IR light from an IR lamp 13 disposed outside of the window. On the side wall of the etching chamber 1 at a position facing the sample 6, is disposed a molecular beam source 14 for carrying out etching of the sample 6 with the chlorine-containing gas 9. The molecular beam source 14 is designed to allow the molecules of the gas 9 to impinge onto the sample 6 by the pressure difference to effect etching of the sample 6 utilizing the reactivity of the gas 9. On the wall surface of the post-treatment chamber 2 at a position facing the sample 6, is disposed an ion shower source 16 through the gas feeding system 11 as the low-accelerating voltage controllable ion shower unit employing a gaseous mixture primarily containing a chlorine-containing gas and additionally an inert gas such as argon, neon and helium. The gas 9 can be fed to both of the molecular beam source 14 and the ion shower source 16 at arbitrary flow rates, respectively; whereas the inert gas 15 is mixed with the chlorine-containing gas 9 through the gas feeding system 11' and supplied to the ion shower source 16. The target plate 7 i the post-treatment chamber 2 has as heater 3 for heating the sample to a temperature in the range from 150° and 500° C.

The results of etching performed using such arrangement of apparatus will be shown below; wherein the evacuation systems, sample, chlorine-containing gas and gaseous mixtures used are as follows:

| | |
|---|---|
| Evacuation system 4: | rotary pump (roughing vacuum pump), turbo-molecular pump |
| Evacuation system 4': | rotary pump, mechanical booster pump, diffusion pump |
| Sample 6: | the same one as used in the first embodiment |
| Chlorine-containing gas 9: | the same one as used in the first embodiment |
| Gaseous mixture: | 60% of carbon tetrachloride and 40% of argon |

The sample 6 was first heated in vacuo in the etching chamber 1, followed by a reactive ion beam etching (primary etching) using the chlorine-containing gas 9 with the sample 6 being maintained at the same temperature under the following etching conditions:

| | |
|---|---|
| Base pressure: | $5 \times 10^{-10}$ torr |
| Flow rate of CCl$_4$ gas: | 20 SCCM |
| Pressure of CCl$_4$ gas: | $1 \times 10^{-4}$ torr |
| Ion beam incident angle: | 0° |
| Sample temperature: | 350° C. |
| Etching time: | 10 min |

Subsequently, the sample 6 was transferred to the post-treatment chamber 2 through the junction 5 using the sample transferring mechanism 12. Post-treatment was carried out by the low-accelerating voltage ion shower using the gaseous mixture to effect secondary etching with heating of the sample by resistance heating under the following post-treatment conditions:

| | |
|---|---|
| Base pressure: | $5 \times 10^{-7}$ torr |
| Flow rate of CCl$_4$ gas: | 15 SCCM |
| Flow rate of argon gas: | 10 SCCM |
| Gas pressure: | $2 \times 10^{-4}$ torr |
| Ion accelerating voltage: | 200 V |
| Ion current density: | 0.1 mA/cm$^2$ |
| Ion shower incident angle: | 0° |
| Sample temperature: | 350° C. |
| Ion shower treating time: | 4 min |

The thus treated sample 6 was removed from the post-treatment chamber 2 and introduced to the ultrasonic wave-applied purified water treatment tank to immerse the sample 6 in the purified water contained therein for 4 minutes to effect ultrasonic wave-applied purified water treatment. Finally, the sample 6 was broken and the broken face was subjected to SEM observation to find that a line pattern of Fe-Si-Al alloy having a rectangular cross section (width: ca 0.49 μm; height: ca. 1.2 μm) was formed. Besides, no etching residue was observed on the sapphire substrate. Line patterns were formed with very good reproducibility, and high etching rate of about 1,200 A. min was achieved also in this test. It was thus identified that the present etching process and apparatus therefor are very useful.

Incidentally, while argon gas was added to provide a gaseous mixture for ion shower in this embodiment, substantially the same effect was obtained when the argon gas was replaced by at least one of other inert gases such as neon, helium, krypton and xenon. While a sample providing chamber 23 is connected to the system of etching apparatus in this embodiment, the etching characteristic may not be affected, if this chamber 23 may be omitted, except for the minor drop in the base pressure to be achieved in the respective chambers.

Third embodiment

Figure 7:
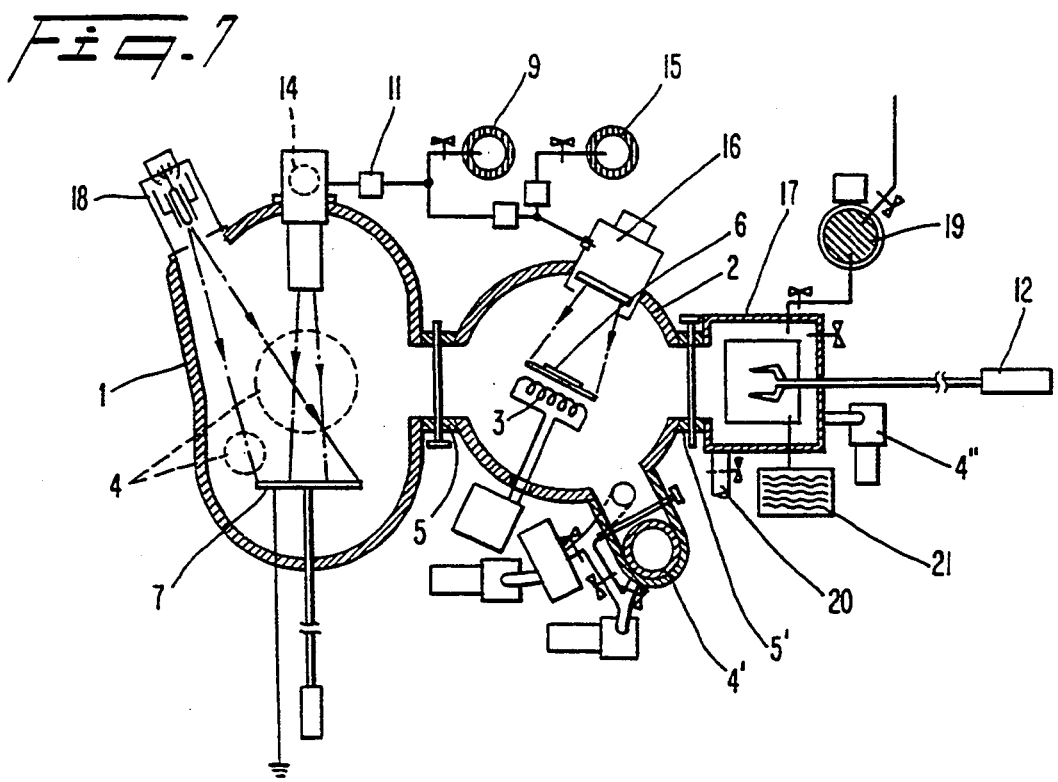

The apparatus used in a third embodiment is as shown in FIG. 7 shows the apparatus schematically in horizontal cross section. The apparatus roughly consists of the same arrangement as in the second embodiment except that the sample providing chamber 23 is omitted and a purified water treatment chamber 17 is additionally provided. In other words, the apparatus roughly consists of an etching chamber 1, a post-treatment chamber 2, a purified water treatment chamber 17, evacuation systems 4,4', 4" connected to the respective chambers and junction 5,5'. Each chamber has a target plate 7 for holding the sample 6. An electron beam 18 is disposed on the wall of the etching chamber 1 at a position facing the sample 6 and designed to heat the surface of the sample by scanning irradiation. Further, a molecular beam source 14 as a system for etching the sample 6 is provided on the wall of the etching chamber 1 at a position facing the sample 6. On the wall of the post-treatment chamber 2 facing the sample 6, is disposed an ion shower source 16 as a low-accelerating voltage controllable ion shower unit using the gaseous mixture consisting primarily of chlorine-containing gas and additionally an inert gas 15 such as argon, neon and helium. The gas 9 can be fed to both of molecular beam source 14 and the ion shower source 16 through the gas feeding system 11. The inert as 15 can be mixed with the chlorine-containing gas through the gas feeding system 11' and supplied to the ion shower source 16. The target plate 7 in the post-treatment chamber 2 has a heater 3 for heating the sample to a temperature in the range from 150° to 500° C. The purified water treatment chamber 17 has a purified water feeding system 19, a water draining system 20, an ultrasonic application system 21 and an evacuation system 4" connected thereto, so that the sample 6 can be immersed in the purified water to which an ultrasonic wave is applied. The sample 6 can travel through the chambers in vacuo with the aid of the sample transferring mechanism 12 through the junctions 5,5'.

The results of etching performed using such arrangement of apparatus will be shown below; wherein the evacuation systems, sample, chlorine-containing gas 9 and gaseous mixture used are as follows:

| | |
|---|---|
| Evacuation system 4: | the same one as used in the second embodiment |
| Evacuation system 4': | the same one as used in the second embodiment |
| Evacuation system 4": | rotary pump |
| Sample 6: | 1.2 mµ-thick thin film of Fe—Si—Al alloy formed by sputtering on a sapphire wafer, with a $SiO_2$ masking pattern having a width of 1 µm and a thickness of 1 µm |
| Chlorine-containing gas 9: | the same one as used in the first embodiment |
| Gaseous mixture: | the same one as used in the second embodiment |

The sample 6 was first heated in vacuo in the etching chamber 1, followed by a reactive molecular beam etching using the chlorine-containing gas 9 (primary etching), with the sample of 6 being maintained at the same temperature under the following etching conditions:

| | |
|---|---|
| Base pressure: | $1 \times 10^{-9}$ torr |
| Flow rate of $CCl_4$ gas: | 20 SCCM |
| Pressure of $CCl_4$ gas: | $1 \times 10^{-4}$ torr |
| Ion beam incident angle: | 0° |
| Sample temperature: | 350° C. |
| Etching time: | 11 min |

Subsequently, the sample 6 was transferred to the post-treatment chamber 2 through the junction 5 using the sample transferring mechanism 12. Post-treatment was carried out by the low-accelerating voltage ion shower using the gaseous mixture to effect secondary etching with heating of the sample by resistance heating under the following post-treatment conditions:

| | |
|---|---|
| Base pressure: | $1 \times 10^{-6}$ torr |
| Flow rate of $CCl_4$ gas: | 15 SCCM |
| Flow rate of argon gas: | 10 SCCM |
| Gas pressure: | $2 \times 10^{-4}$ torr |
| Ion accelerating voltage: | 200 V |
| Ion current density: | 0.1 $mA/cm^2$ |
| Ion shower incident angle: | 0° |
| Sample temperature: | 350° C. |
| Etching time: | 5 min |

The thus treated sampled 6 was transferred to the purified waste treatment chamber 17 through the junction 5' using the sample transferring mechanism 12. After the nitrogen gas in the purified water treatment chamber 17 was leaked, a purified water was introduced to the chamber 17, and an ultrasonic wave was applied to the sample 6 immersed in the purified water under the following treatment conditions:

| | |
|---|---|
| Water temperature: | 25° C. |
| Ultrasonic wave application time: | 4 min |

Subsequently, the sample 6 was removed from the purified water treatment chamber 17, and finally the broken face of the sample 6 was subjected to SEM observation to find that a line pattern of Fe-Si-Al alloy having a substantially rectangular cross section (width: ca. 0.95 µm; height: ca. 1.2 µm) was formed. Besides, no etching residue was observed on the sapphire substrate. Line pattern were formed with very good reproducibility, and a high etching rate of about 1,100 A/min was achieved also in this test. It was thus identified that the present etching process and apparatus therefor are very useful.

Incidentally, while argon gas was added to provide a gaseous mixture for ion shower ion this embodiment, substantially the same effect was obtained when the argon gas was replaced by at least one of other inert gases such as neon, helium, krypton and xenon. While another example of the arrangement of the etching chamber, post-treatment chamber and purified water treatment chamber 17 is schematically shown in FIG. 8, the similar results to those in the third embodiment were obtained also in this arrangement.

Fourth embodiment

The apparatus used in a fourth embodiment is as shown in FIG. 9. FIG. 9 shows the apparatus schematically in horizontal cross section. The apparatus roughly consists of an etching chamber 1, a post-treatment chamber 2, evacuation system 4, 4' connected to the respective chambers, a junction 5, and a target plate 7 for holding the sample 6 is the same as used in the second embodiment. The post-treatment chamber 2 has a quartz window on the wall thereof at a position facing the sample so that the sample can be heated by the IR light irradiated from the IR lamp 13 disposed outside of the window. Further, a Kaufman type ion source 10 for carrying out etching of the sample 6 with the chloride-containing gas 9 is disposed on the wall of the etching chamber 1 at a position facing the sample 6. The gas 9 can be fed to both of the ion source 10 and the post-treatment chamber 2 through the gas feeding system 11 at arbitrary flow rates, respectively. The post-treatment chamber 2 has a purified water feeding system 19, a water draining system 20, an ultrasonic wave application system 21 and an evacuation system 4'' so as to be able to immerse the sample 6 in the purified water to which an ultrasonic wave is applied. The sample 6 can travel through the chambers in vacuo through the junction 5 with the aid of the sample transferring mechanism 12.

The results of etching performed using such arrangement of apparatus will be shown below; wherein the evacuation systems, sample and chloride series gas used are as follows:

| Evacuation system 4: | rotary pump, mechanical booster pump, diffusion pump |
| --- | --- |
| Evacuation system 4': | rotary pump, mechanical booster pump, diffusion pump |
| Sample 6: | 1.2 m$\mu$ thick thin-film film of Fe—Si—Al alloy formed by sputtering on a sapphire wafer, with a $SiO_2$ masking pattern having a width of 1.2 $\mu$m and a thickness of 1 $\mu$m |
| Chlorine-containing gas 9: | the same one as used in the first embodiment |

The sample 6 was first heated in vacuo in the etching chamber 1, followed by a reactive ion beam etching using the chlorine-containing gas 9 under the following etching conditions:

| Base pressure: | $1 \times 10^{-6}$ torr |
| --- | --- |
| Flow rate of $CCl_4$ gas: | 20 SCCM |
| Pressure of $CCl_4$ gas: | $2 \times 10^{-4}$ torr |
| Ion accelerating voltage: | 500 V |
| Ion current density: | 0.9 mA/cm$^2$ |
| Ion beam incident angle: | 30° |
| Sample temperature: | 350° C. |
| Etching time: | 11 min |

Subsequently, the sample 6 was transferred to the post-treatment chamber 2 through the junction 5 using the sample transferring mechanism 12. Post-treatment was first carried out by heating the sample with the IR lamp 13 under reduced pressure in a carbon tetrachloride gas atmosphere under the following post-treatment conditions:

| Base pressure: | $5 \times 10^{-5}$ torr |
| --- | --- |
| Flow rate of $CCl_4$ gas: | 30 SCCM |
| Pressure of $CCl_4$ gas: | 3 Pa |
| Sample temperature: | 350° C. |
| Treating time: | 11 min |

After the nitrogen gas in the post-treatment chamber 2 was leaked, a purified water was introduced to the chamber 2 to carry out purified water treatment. It should be confirmed before introduction of the purified water that the temperature of the sample 6 is sufficiently be lowered. The purified water treatment was carried out by applying an ultrasonic wave to the sample 6 immersed in the purified water under the following treatment conditions:

| Water temperature: | 25° C. |
| --- | --- |
| Ultrasonic wave application time: | 4 min |

The thus treated sample 6 was removed from the post-treatment chamber 2, and finally the broken face of the sample 6 was subjected to SEM observation to find that a line pattern of Fe-Si-Al alloy having a substantially rectangular cross section (width: ca. 1.17 $\mu$m; height: ca. 1.2 $\mu$m) was formed. Besides, no etching residue was observed on the sapphire substrate. Line pattern were formed with very good reproducibility, and a very high etching rate of about 1,000 A/min was achieved also in this test. It was thus identified that the present etching process and apparatus therefor are very useful.

While four embodiments of this invention have been exemplified above, the same effect as exhibited in these embodiments can also be obtained when any of the apparatus, etching process and material shown below are used:

(1) The mode of heating the sample and the system for heating the sample may not be limited only to those exemplified in the above embodiments, but other modes and systems such as heating by IR lamp irradiation, heating by laser beam irradiation, heating by particle beam irradiation such as of the electron beam, resistance heating, etc. or combinations thereof can also be used.

(2) The chloride-containing gas may not be limited only to carbon tetrachloride as exemplified above, and other gases such as chloride gas, C-Cl-H gas, C-Cl-F gas, $BCl_3$ gas, B-Cl-H gas, B-Cl-F gas, $ClF_3$ gas and hydrogen chloride gas or mixture thereof can also be used.

(3) The procedure of reactive etching may not limited only to the one exemplified above, and other procedures such as to expose the sample to high-frequency plasma of the above gas, to subject the sample to bombardment of the molecules of the gas utilizing the pressure difference, to expose the sample to a beam of the ionized gas accelerated by an electric field and combinations thereof may also be used.

(4) The evacuation system of course may not be limited to those exemplified above, and other pumps such as a cryosorption pump can be used depending on the base pressure to be achieved.

(5) While an Fe-Si-Al alloy was used as the sample to be etched in the above embodiments, it is also possible to etch other Fe-containing materials such as pure iron, ferrite and iron nitride. It should of course be understood that even Fe-free materials can also be etched if the vapor pressure thereof can be elevated to that of iron chloride by heating.

As has been described heretofore, by using the process and apparatus for etching Fe-containing materials according to this invention, the problem of insufficient etching rate inherent in the prior art can be solved, and the through-put in the production of thin-film magnetic heads can greatly be improved. Besides, since the present process and apparatus enable etching of a narrow pattern having a rectangular cross section, recording density can be improved. Further, since the etching residues left after completion of etching which is the problem inherent in the prior art can completely be removed, thin-film magnetic heads having excellent environmental resistance can be produced. The absence of etching residues allows improvement of the magnetic heads.

I claim:

1. A process for etching a film of Fe-containing material forming the surface of a sample, which comprises:

subjecting the sample to reactive etching in an atmosphere of chlorine-containing gas while the sample is heated to not lower than 250° C. in vacuo;

subjecting the sample to post-treatment so as to allow the etching residues left on the sample surface to react fully with the chlorine-containing gas; and then subjecting the sample to a purified water treatment by immersing the sample in a purified water so as to dissolve and remove the etching products formed during said post-treatment step.

2. The process for etching a film of Fe-containing material according to claim 1, wherein the sample is heated to not lower than 250° C. and not higher than the melting point of the sample under reduced pressure or in vacuo in a chlorine-containing gas atmosphere.

3. The process for etching a film of Fe-containing material according to claim 1, wherein the sample is subjected to an ion shower of a gaseous mixture comprising the chlorine-containing gas and at least one inert gas at a low accelerating voltage, while the sample is heated to not lower than 250° C. and not higher than the melting point of the sample.

4. A process for etching a film of an iron-silicon-aluminum alloy or pure iron material forming the surface of a sample, which comprises:

subjecting the sample to reactive etching in an atmosphere of chlorine-containing gas while the sample is heated to not lower than 250° C. in vacuo;

subjecting the sample to post-treatment so as to allow the etching residues left on the sample surface to react fully with the chlorine-containing gas; and then subjecting the sample to a purified water treatment by immersing the sample in purified water so as to dissolve and remove the etching products formed during said post-treatment step.

* * * * *